United States Patent [19]

Ambardanishvili et al.

[11] 3,931,523
[45] Jan. 6, 1976

[54] ACTIVATION NEUTRON DETECTOR

[76] Inventors: Tristan Silovanovich Ambardanishvili, territori-a ippodroma, korpus 4, kv. 38; Mikhail Alexandrovich Kolomiitsev, ulitsa Ozhio, 7, both of Tbilisi; Tamara Yakovlevna Zakharina, Mtskhetsky raion, poselok ZAGES, ulitsa Lenina 24, kv. 22, Grunzinskaya SSR; Vakhtang Justinovich Dundua, territori-a ippodroma, korpus 4, kv. 25; Ninel Vladimirovna Chikhladze, Digomsky massiv, kvartal 6, korpus 10, kv. 28, both of Tbilisi, all of U.S.S.R.

[22] Filed: Nov. 8, 1973

[21] Appl. No.: 414,105

[52] U.S. Cl. .............................. 250/390; 250/472
[51] Int. Cl. ................................. G01t 3/00
[58] Field of Search ........... 250/337, 390, 391, 472, 250/473, 484; 252/301.1 R

[56] References Cited
UNITED STATES PATENTS

| 3,471,699 | 10/1969 | McCall | 250/484 |
| 3,516,939 | 6/1970 | Yokota et al. | 250/472 X |

*Primary Examiner*—James W. Lawrence
*Assistant Examiner*—Davis L. Willis
*Attorney, Agent, or Firm*—Haseltine, Lake & Waters

[57] ABSTRACT

An activation neutron detector made as a moulded and cured composition of a material capable of being neutron-activated. The material is selected from a group consisting of at least two chemical elements, a compound of at least two chemical elements and their mixture, each of the chemical elements being capable of interacting with neutrons to form radioactive isotopes having different radiation energies when disintegrating. The material capable of being neutron-activated is distributed throughout the volume of a polycondensation resin inert with respect to neutrons and capable of curing.

17 Claims, No Drawings

ACTIVATION NEUTRON DETECTOR

The present invention relates to neutron dosimetry, and more particularly to an activation neutron detector.

Activation neutron detectors are used to measure integrated fluxes of thermal and fast neutrons during the irradiation of a sample, as well as neutron-field intensities.

In what follows, by an activation neutron detector is meant a detector made as a material capable of being neutron-activated and including neutron-sensitive elements, the radioactivity of which can be measured after irradiation by methods commonly used for measuring ionizing particles, and data obtained as a result of such measurements can be used to calculate the neutron flux at the point where a sensing element has been irradiated.

Activation neutron detectors are known in which chemically pure elements are used as the detecting material. Such activation detectors are made in the form of tablets, thin foils, wires, films sputtered onto substrates inert with respect to neutrons, or as a mixture with a polymer binder.

Also known is an activation neutron detector made as a moulded and cured composition comprising an element capable of being neutron-activated and distributed throughout the volume of a cured polycondensation resin inert with respect to neutrons.

These known detectors, however, suffer from a number of disadvantages. Each of them comprises only one neutronsensitive element serving, after irradiation, as a source of information on the parameters of the neutron field.

As a consequence, the irradiation of one detector, followed by measuring its radioactivity, furnishes information, according to the neutron-sensitive element, either on the thermal-neutron flux at the point of irradiation or on the integral fast-neutron spectrum having an energy above the effective threshold energy for the given neutron-sensitive element of the detector under consideration.

To obtain a full fast-neutron spectrum with the aid of the above detectors, a plurality of them has to be irradiated in succession and their radioactivity measured, also in succession.

"Sandwiches" made up by superposing individual detectors with different neutron-sensitive elements are not used, because various elements therein are in dissimilar conditions with respect to neutrons. In this case, the inner layers of the "sandwiches" are in a neutron-deficient flux due to a partial absorption of neutrons by the outer layers. The foregoing holds true for the detectors of all the above-mentioned types. What is more, some widely used detectors that contain sulphur, phosphorus or other elements easily melt, inflame and are unstable.

Besides, in detectors made as moulded and cured compositions, namely solid solutions of a neutron-sensitive element in a polycondensation resin, there occurs a thermalization of fast neutrons on the nuclei of the hydrogen which enters into the composition of the resin.

This effect rules out the possibility of using "sandwiches" produced by superposing individual detectors based on polycondensation resins.

On the other hand, in most cases, information on both thermal and fast-neutron fluxes or on a fast-neutron spectrum should be acquired at the same time from a single irradiated detector.

It is an object of the present invention, therefore, to provide detectors of such a composition which make it possible, as a result of measuring the activity of a single irradiated detector, to obtain information on both thermal and fast-neutron fluxes or on the fast-neutron spectrum at a time.

Another object of the invention is to reduce the concentration of hydrogen in detectors and attenuate the thermalization of fast neutrons.

Still another object of the invention is to enhance the thermal stability of detectors containing such neutron-sensitive elements which are normally unstable and easily melt, oxidize and inflame.

These and other objects are achieved in an activation neutron detector made as a moulded and cured composition of a material capable of being neutron-activated and distributed throughout the volume of a polycondensation resin inert with respect to neutrons and capable of curing, wherein the material consists of at least two chemical elements, each forming radioactive isotopes that have different radiation energies when spontaneously disintegrating under the effect of neutrons as a result of activation, the elements being in the form of chemically free substances, or in the form of substances having these elements in a bound form, or a combination of the form of chemical elements.

It is yet another object of the invention to eliminate the drawbacks of prior-art detectors.

To measure high integrated neutron fluxes of up to $10^{20}$ n/cm² it is preferable that the detectors be made as a moulded and cured composition of a solid solution of a neutron-sensitive element producing, when neutron-irradiated, a long-lived isotope, and of a powdered oxide of a neutronsensitive element having a melting point above 300°C and producing, when irradiated with fast neutrons, a short-lived radioactive isotope. The isotopes thus produced have different radiation energies when disintegrating and can be measured separately.

It is also possible to use detectors made as a moulded and cured composition in which the material capable of being neutron-activated is alumina, for the measurement of integrated fast-neutron fluxes in hard neutron spectra.

It is expedient to use detectors containing magnesium oxide as the material capable of being neutron-activated.

It is also expedient to use detectors made as a moulded and cured composition which is a solid solution of a salt formed by a metal, such as cobalt, nickel or iron, and a an acid radical inert with respect to neutrons, in a polycondensation resin, mixed with alumina.

If a detector containing alumina and a salt of cobalt is used to measure radioactivity, it provides information on the integrated thermal-neutron flux.

If a detector containing alumina and salts of nickel and iron is used to measure radioactivity, the information furnished thereby will be on the integrated fast-neutron flux with threshold energies below that of aluminium.

It is advisable to use a detector containing a solid solution of a salt formed by a metal, such as cobalt, nickel or iron, and an acid radical inert with respect to neutrons, in a polycondensation resin, mixed with magnesium oxide.

The substitution of part of the polycondensation resin in a composition with an oxide of a metal reduces the hydrogen content therein, hence attenuates the thermalization of fast neutrons. The presence of an oxide of a metal in the polymer composition increases the radiation resistance up to $10^{20}$ n/cm$^2$.

It is also advisable to use a detector made as a moulded and cured composition of a solid solution of a salt formed by indium or mercury and an acid radical inert with respect to neutrons, in the copolymer of phenol-formaldehyde resol resin with meta-chlorophenol-formaldehyde resin in combination with a mixture of aluminum, nickel, iron and thallium oxides.

It is expedient that the content of chlorine in the metachlorophenol-formaldehyde resin be 5% by weight.

In this case, to have an almost equal activity from different isotopes, the content of the composition components should preferably be as follows (in weight parts):

| | |
|---|---|
| alumina | - 15 |
| nickel oxide | - 10 |
| iron oxide | - 3 |
| thallium oxide | - 1 |
| indium nitrate | - 0.03 |
| mercuric nitrate | - 0.1 |
| copolymer of phenol-formaldehyde resol resin with meta-chlorophenol-formaldehyde resin containing 5% Cl by weight | - 10 |

Such a detector should be used for obtaining the fast-neutron spectrum by calculations based on the data acquired as a result of measurement of the isotope gamma spectrum by means of a multichannel pulse analyzer with a semiconductor sensor having a resolving power of about 2 to 5 kev.

An activation detector whose gamma spectrum can be measured after irradiation by means of a simple multichannel device, in which a crystal scintillator of the NaJ(Tl) type is used as the sensor, should be based on a composition made up of a solid solution of inidum nitrate in a polycondensation resin in combination with a mixture of oxides of nickel and aluminum. In such a detector, to have an almost equal activity from different isotopes after its irradiation in the uranium fission spectrum, the content of the composition components should preferably be as follows (in weight parts):

| | |
|---|---|
| nickel oxide | - 25 |
| alumina | - 40 |
| indium nitrate | - 2.5 |
| polycondensation resin | - 50 |

It is also possible to use a detector made as a moulded and cured composition in which mercury sulphide or ferrous sulphide powder used as the material capable of being neutron-activated.

It is expedient to use this activation detector as a double heat-resistant threshold detector.

The radioactivity of a detector containing ferrous sulphide is measured, after irradiation, by the gamma activity of Mn$^{56}$ and, after the decay of Mn$^{56}$, by the beta activity of P$^{32}$.

A detector containing mercuric sulphide can also be used as a double threshold detector with mercury and sulphur. In this case, the neutron-sensitive elements of mercury and sulphur, which easily melt and volatilize under normal condition, mixed in this composition with a polycondensation resin, are resistant to heat up to 250°C, and the mouldability and stability of the detector are best ensured with the following content of the composition components (in weight parts):

| | |
|---|---|
| mercuric sulphide | - 80 |
| polycondensation resin | - 20 |

For the measurement of the neutron gas temperature a detector is used made as a moulded and cured composition of a solid solution of a salt of lutecium with an acid radical inert with respect to neutrons, in a polycondensation resin, mixed with red phosphorus.

In such a detector, the content of the composition components should be as follows (in weight parts):

| | |
|---|---|
| red phosphorus | - 25 |
| lutecium nitrate | - 2 |
| polycondensation resin | - 73 |

The introduction of new neutron-sensitive elements into the composition of a known activation neutron detector is conducive to an attenuation of the thermalization of fast neutrons in the detector and increases the amount of information on the neutron field parameters; the radiation resistance of the detector improves as well.

The geometrical dimensions of the detector containing several chemical elements make it convenient in use.

These properties of the proposed detectors permit of extending the field of their application.

The proposed activation neutron detectors are prepared as follows.

An alcoholic solution is prepared of a polycondensation resin capable of curing. Then, an alcoholic solution of salts is introduced into this solution namely of a metal capable of being neutron-activated with acid radicals inert with respect to neutrons. The solution is intimately mixed and the alcohol is topped therefrom. As a result, there is produced a resol syrup which is a true solution of salts in the resol. The syrup is partially cured under a vacuum of about 10 to 50 mm Hg at a temperature of about 80°C for 2 to 3 hours to form melted insoluble product known as resitol. The porous resitol thus obtained is cooled to room temperature and crushed to a fine powder from which tablets are pressed under 200 to 2,000 kg/cm$^2$. These tablets are placed in a thermostat and held there at a temperature of 120° to 150°C for 3 hours, as a result of which they are cured to a non-melting non-soluble state, thus forming resite. In this state, they attain vitreous structure and high mechanical strength.

When a detector contains powders of free elements of oxides and sulphides of iron or mercury which are not soluble in alcohol, these powders are mechanically mixed with an alcoholic solution of either resol or resol with salts dissolved therein, whereafter the mixture is used to prepare tablets in a manner as described above.

This preparation process ensures a uniform distribution of salts of such neutron-sensitive elements, the content whereof in the detector must be low as determined by the activation conditions of these elements and the conditions of measurement of the activity of the isotopes formed therein.

The deviation of the element concentration in individual detectors from the mean value does not exceed 0.3 to 0.5%.

For a better understanding of the invention, specific examples of preparing individual activation neutron detectors are given below.

EXAMPLE 1

An activation neutron detector is made as a moulded and cured composition of a solid solution of indium and nickel nitrates in phenol-formaldehyde resol resin.

In this composition, the content of its components is as follows (in weight parts):

| | |
|---|---|
| indium nitrate | - 0.5 |
| nickel nitrate | - 15 |
| phenol-formaldehyde resol resin | - 84.5 |

This detector is prepared as follows.

0.5 weight parts of $In(NO_3)_3$ and 15 weight parts of $Ni(NO_3)_3$ are placed in a flask to which are added 200 weight parts of rectified ethyl alcohol, and the contents of the flask are heated until they are completely dissolved. The resulting solution is passed through a porous glass filter, the filtrate is transferred to a round-bottom flask, and 169 weight parts of a 50% solution of phenol-formaldehyde resol in ethyl alcohol are introduced thereinto.

The alcohol is topped from the mixture under vacuum and the resulting homogeneous resol syrup is heated under a vacuum of about 50 mm Hg at a temperature of about 80°C for a period of three hours. In so doing, the resol syrup partially cures, passing into resitol. After cooling to room temperature, the resitol is crushed to fine powder from which tablets are pressed under 200 to 2,000 $kg/cm^2$, which tablets finally cure as the resin passes into resite at a temperature of about 150°C.

The tablets thus obtained have a high mechanical strength (a microhardness of about 30 $kg/mm^2$), a heat resistance of up to 250°C and a radiation resistance to an integrated fast neutron flux of about $10^{19}$ $n/cm^2$.

Since the material of the detector is a solid molecular solution of salts of indium and nickel in resol, these elements are uniformly distributed in the resin, and the specific content of the elements is practically the same in all the detectors of a batch.

A tablet measuring approximately 8 × 1.5 mm weighs 100 mg.

After irradiation with a fast neutron flux of about $10^{16}$ $n/cm^2$, the detector is allowed to stand for about 24 hours, then its activity is measured with a multichannel pulse analyzer. In this case, a crystal scintillator NaJ(Tl) is used as the sensor for separately determining the activity of isotopes $In^{115m}$ and $Co^{58}$ formed from the indium and the nickel.

Calculated from the activity of $In^{115m}$ is the integrated fast neutron flux with an energy of more than 1.15 Mev, while calculated from the activity of $Co^{58}$ is the integrated fast neutron flux with an energy of more than 2.55 Mev.

Thus, the irradiation of a single detector furnishes information on integrated neutron fluxes with two above-mentioned energies.

EXAMPLE 2

An activation neutron detector is made as a moulded and cured composition of a solid solution of a mixture of any nitrate in phenol-formaldehyde resol resin. Therewith, each of the metals is a threshold detector forming a gamma-active isotope with different photopeak energies render the effect of fast neutrons.

The total amount of all the salts in the resin, calculated as metal, does not exceed 3% of the resin weight.

Such a detector can be prepared as specified in Example 1.

After irradiation in a fast neutron flux, the activity of the detector is measured with a multichannel analyzer, the sensor whereof provides for resolving all the photopeaks of the radioactive isotopes formed in the detector. The activation data obtained as a result of the measurement of the activity of such a detector are used to determine the fast neutron spectrum in the irradiated region.

EXAMPLE 3

An activation neutron detector is made as a moulded and cured composition of a solid solution of a mixture of acetates of any element in aniline-formaldehyde resin. Otherwise, this detector is similar to the one described in Example 2.

EXAMPLE 4

An activation neutron detector is made as a moulded and cured composition which is a conglomerate of powdered compounds of neutron-sensitive elements and a solid solution of salts of neutron-sensitive elements in a polyblend containing two weight parts of phenol-formaldehyde resin and one weight part of phenol-benzaldehyde novolak resin. Elementary sulphur is used as the powder, and the solid solution is based on ferrous nitrate. The content of the composition components is as follows (in weight parts):

| | |
|---|---|
| polyblend | - 25 |
| ferrous nitrate | - 4 |
| elementary sulphur | - 71 |

After irradiation in a fast neutron flux, measurements are made of the activity of $Mn^{56}$ formed from iron as a result of the nuclear reaction $Fe^{56}(n, p)Mn^{56}$. Then, 48 hours after the decay of $Mn^{56}$, there is measured the activity of $P^{32}$ formed as a result of the reaction $S^{32}(n, p)P^{32}$.

The data thus obtained are used for the calculation of the fast neutron fluxes in the irradiated region.

EXAMPLE 5

An activation neutron detector is made as a moulded and cured composition which is a conglomerate of an oxide of a metal plus a solid solution of nitrates of metals.

In this particular case, oxides perform a number of functions: the metals in these oxides are neutron-sensitive, therefore they can provide information on neutron fluxes; the oxides increase the radiation resistance of the solid solution of salts in a polymer to an integrated neutron flux of about $10^{20}$ $n/cm^2$ against $10^{19}$ $n/cm^2$ for compositions containing no oxides; and a high content of oxides attenuates the thermalization of fast neutrons on nuclei of the hydrogen forming part of the resin.

Tabulated below are compositions of detectors containing oxides of metals and a solution of other elements in phenol-formaldehyde resol resin (in weight parts).

| Oxides | Content of oxides | Content of resin | Content of other elements in a solid solution thereof in resin | |
|---|---|---|---|---|
| TiO$_2$ | 50 | 49 | Zn(NO$_3$)$_2$ | - 1 |
| Al$_2$O$_3$ | 80 | 19.9 | Co(NO$_3$)$_2$ | - 0.1 |
| Al$_2$O$_3$ | 80 | 18.9 | Ni(NO$_3$)$_2$ | - 1.1 |
| MgO | 90 | 9.99 | Co(NO$_3$)$_2$ | - 0.01 |

These oxide-containing detectors should preferably be used as monitors with samples irradiated with integrated neutron fluxes of about $10^{20}$ n/cm$^2$.

EXAMPLE 6

An activation neutron detector is made as a composition with the same neutron-sensitive elements as in Example 5, and with melamine-formaldehyde resin used as the polycondensation resin. The properties of this detector are similar to those of the detector of Example 5.

EXAMPLE 7

An activation neutron detector is made as a composition with the same neutron-sensitive elements as in Example 5, and with resorcin-formaldehyde resin used as the polycondensation resin. The properties of this detector are similar to those of the detector of Example 5.

EXAMPLE 8

An activation neutron detector is made as a moulded and cured composition which is a conglomerate of alumina and a solid solution of nickel acetate in phenol-formaldehyde resol resin.

The content of the composition components is as follows (in weight parts):

| | |
|---|---|
| phenol-formaldehyde resol resin | - 10 |
| alumina | - 89.5 |
| nickel acetate | - 0.5 |

This detector can be prepared in the following manner.

Introduced into 40 weight parts of a 25% solution of resol are 0.5 weight parts of nickel acetate dissolved in alcohol. Then, added to the resulting mixture is a fine powder of chemically pure alumina taken in an amount of 89.5 weight parts. The mixture is thoroughly stirred and the alcohol is evaporated therefrom at a temperature of 60° to 70°C.

The residue is cooled to room temperature, crushed to fine powder and sifted through a sieve with a mesh of not more than 100 mu. Tablets are pressed from this powder, which finally cures at a temperature of about 150°C. These tablets make detectors which can advantageously be used to measure integrated fast neutron fluxes.

EXAMPLE 9

An activation neutron detector is made as a moulded and cured composition which is a conglomerate of magnesium oxide and a solid solution of cobaltous propionate in phenol-formaldehyde resol resin.

The content of the composition components is as follows (in weight parts):

| | |
|---|---|
| magnesium oxide | - 74.995 |
| cobaltous propionate | - 0.005 |
| phenol-formaldehyde resol resin | - 25 |

This detector can be prepared as follows.

0.005 weight parts of an alcoholic solution of cobaltous propionate are introduced into 50 weight parts of a 50% alcoholic solution of phenol-formaldehyde resol resin. The alcohol is evaporated from the mixture thus obtained, and the residue is crushed to fine powder as in Example 1. The resulting resitol powder is mixed with 75.995 weight parts of powdered chemically pure magnesium oxide, and tablets are pressed from the mixture, which are then cured at 150°C for 2–3 hours.

This detector is used to measure integrated thermal neutron fluxes of about $10^{20}$ n/cm$^2$ at, a temperature of no more than 300°C, in the irradiated region.

EXAMPLE 10

An activation neutron detector is made as a moulded and cured composition which is a conglomerate of alumina and a solid solution of ferrous nitrate in phenol-formaldehyde resol resin.

The content of the composition components is as follows (in weight parts):

| | |
|---|---|
| alumina | - 97 |
| ferrous nitrate | - 0.05 |
| phenol-formaldehyde resol resin | - 2.95 |

The detector is prepared as in Example 8. It is used to measure integrated neutron fluxes of $10^{21}$ n/cm$^2$ at a temperature of not more than 1,400°C.

EXAMPLE 11

An activation neutron detector is made as a composition with the same neutron-sensitive elements as in Example 10 and with a mixture of phenol-formaldehyde resol, and anilineformaldehyde resins used as the polycondensation resin, which resins are taken in the ratio 1:1. The properties of this detector are similar to those of the detector of Example 10.

EXAMPLE 12

An activation neutron detector is made as a moulded and cured composition which is a conglomerate of a mixture of oxides of aluminium (Al$_2$O$_3$), nickel (Ni$_2$O$_3$), iron (Fe$_2$O$_3$) and thallium (Tl$_2$O), and a solid solution of salts of indium (In$^{3+}$) and mercury (Hg$^{2+}$) with acid radicals inert with respect to neutrons, in a copolymer of phenol-formaldehyde resol resin with meta-chlorophenol-formaldehyde resin.

The content of the composition components is as follows (in weight parts):

| | |
|---|---|
| alumina | - 15 |
| nickel oxide | - 10 |
| iron oxide | - 3 |
| thallium oxide | - 1 |
| indium nitrate | - 0.03 |
| mercuric nitrate | - 0.1 |
| copolymer, with 5% Cl by weight | - 10 |

This detector is prepared in the following manner.

30 weight parts of alumina, 20 weight parts of nickel oxide, 6 weight parts of iron oxide and 2 weight parts of thallium oxide are mixed with 20 weight parts of a 25% alcoholic solution of the copolymer of phenol-formaldehyde resol and meta-chlorophenol-formaldehyde resins, the latter resin containing 10% Cl by weight.

The mixture is thoroughly stirred, then the alcohol is topped therefrom and the mixture is cured till it passes into resitol. The resulting conglomerate is crushed, at room temperature, to a fine powder which is sifted through a sieve with a mesh of not more than 50 mu. 34 weight parts of this powder are taken to be mixed with 5.13 weight parts of the powder which is a solid solution of 0.1 weight parts of mercuric nitrate and 0.03 weight parts of indium nitrate in 5 weight parts of phenolformaldehyde resol resin in the resitol stage (the process of preparing a solid solution of salts in a polycondensation resin is described in Example 1).

The powders are intimately mixed, then the resulting mixture is pressed to tablets which are cured at a temperature of 150°C.

The detectors thus prepared are irradiated in the fast neutron spectrum with an integrated neutron flux of about $10^{17}$ n/cm$^2$ (the detector weighs 100 mg).

To eliminate thermal neutron contribution, the detectors are enclosed in hermetic sheaths made from metallic cadmium.

As a result of fast-neutron irradiation, threshold nuclear reactions occur on In, Hg, Ni, Fe, Al, Tl and Cl.

Multichannel radiometric devices with semiconductor crystals having high resolving power are used to separately measure the activity of each isotope produced by the reactions. The activity of $P^{32}$ formed as a result of the reaction $C^{35}$ (n, α $P^{32}$ is measured by beta radiation.

The activation data thus obtained are used to determine the fast neutron spectrum in the irradiated region.

EXAMPLE 13

An activation neutron detector is made as a moulded and cured composition which is a conglomerate of a mixture of oxides $Ni_2O_3$ and $Al_2O_3$ with a solid solution of indium nitrate in phenol-formaldehyde resol resin.

The content of the composition components is as follows (in weight parts):

| | |
|---|---|
| nickel oxide | - 25 |
| alumina | - 40 |
| indium nitrate | - 2.5 |
| phenol-formaldehyde resol resin | - 50 |

The detector is prepared according to the process of Example 12.

After the detector, enclosed in a cadmium sheath, has been irradiated, its activativy in the fast neutron spectrum is measured with the sensor, a crystal scintillator NaJ(Tl), of a multichannel pulse analyzer. The data thus obtained provide information on the energy distribution of fast neutrons in the core of a nuclear reactor.

EXAMPLE 14

An activation neutron detector is made as a moulded and cured composition with the following content of its components (in weight parts):

| | |
|---|---|
| alumina | - 15 |
| nickel oxide | - 10 |
| iron oxide | - 3 |
| thallium oxide | - 1 |
| mercuric nitrate | - 0.1 |
| indium nitrate | - 0.03 |
| copolymer of phenol-formaldehyde resin with meta-chlorophenol-formaldehyde resin containing 2.5% Cl by weight | - 20 |

The properties of this detector are similar to those of the detector of Example 12.

EXAMPLE 15

A detector is made as a composition with the same neutron-sensitive elements as in Example 13, and with resorcin-formaldehyde resol resin used as the polycondensation resin.

This detector is similar in properties to that of Example 13.

EXAMPLE 16

An activation neutron detector is made as a moulded and cured composition which is a conglomerate of powdered ferrous sulphide and phenol-formaldehyde resol resin.

The content of the composition components is as follows (in weight parts):

| | |
|---|---|
| ferrous sulphide | - 75 |
| phenol-formaldehyde resol resin | - 25 |

This detector is used as a double threshold detector. In this case, a gamma quantum analyzer is used to measure, after irradiation, the activity of $Mn^{56}$ formed as a result of the nuclear reaction $Fe^{56}$ (n, p)$Mn^{56}$. Then the detector is allowed to stand for 24 to 48 hours and measurements are taken of the activity of $P^{32}$, resulting from the reaction $S^{32}$ (n, p)$P^{32}$, by beta radiation.

A detector containing FeS is used in the air up to a temperature of 400°C and in vacuum or in an inert gas medium up to 800°C.

EXAMPLE 17

An activation neutron detector is made as a moulded and cured composition which is a conglomerate of powdered mercuric sulphide and phenol-formaldehyde resol resin.

The content of the composition components is as follows (in weight parts):

| | |
|---|---|
| mercuric sulphide | - 80 |
| phenol-formaldehyde resol resin | - 20 |

This detector is used as a mechanically strong and heat-resistant (up to 250°C) double threshold detector with mercury and sulphur.

EXAMPLE 18

An activation neutron detector is made as a composition with the same content of its components as in Example 16 with the difference that aniline-formaldehyde resin is used as the polycondensation resin.

The properties of this detector are similar to those of the detector of Example 16.

EXAMPLE 19

An activation neutron detector is made as a moulded and cured composition which is a conglomerate of powdered red phosphorus and a solid solution of lutecium acetate in phenol-formaldehyde resol resin.

The content of the composition components is as follows (in weight parts):

```
red phosphorus             - 25
lutecium acetate           - 2
phenol-formaldehyde resol resin  - 73
```

This detector can operate at temperatures up to 300°C and is non-flammable when subjected to friction or shocks. It can be most advantageously used for measuring neutron gas temperature.

EXAMPLE 20

An activation neutron detector having the same composition as the one described in Example 19 with the difference that lutecium nitrate $Lu(NO_3)_3$ is used as the salt of lutecium with an acid radical inert with respect to neutrons. The properties and application of this detector are similar to those of the detector of Example 18.

EXAMPLE 21

An activation neutron detector having the same composition as the one described in Example 18 with the difference that a mixture containing 30% of phenol-formaldehyde novolak resin and 70% of resorcin-formaldehyde is used as the polycondensation resin.

The detectors of Examples 18 to 20 are used to measure neutron gas temperature. They can operate at temperatures up to 300°C.

What is claimed is:

1. An activation neutron detector in the form of a molded and cured composition, comprising a polycondensation resin inert to neutrons, and a material capable of being activated by neutrons to form a radioactive isotope, and distributed over the entire volume of said resin, said material consisting of at least two chemical elements, each forming radioactive isotopes that have different radiation energies when spontaneously disintegrating under the effect of neutrons as a result of activation, said elements being in the form of chemically free substances, of substances having said elements in a bound form, or a combination thereof.

2. The detector as defined in claim 1, wherein said material is in the form of oxides of neutron-sensitive elements having a melting point above 300°C.

3. The detector as defined in claim 2, wherein said material is alumina.

4. The detector as defined in claim 2, wherein said material is magnesium oxide.

5. The detector as defined in claim 1, wherein said material is a powder of mercuric sulphide.

6. The detector as defined in claim 5, wherein the content by weight of the components in said composition is as follows:

```
80 parts of HgS, and
20 parts of polycondensation resin.
```

7. The detector as defined in claim 1, wherein said material is a powder of ferrous sulphide.

8. The detector as defined in claim 1, wherein said composition is a solid solution of a salt formed by a metal selected from the group consisting of cobalt, nickel and iron, and an acid radical inert to neutrons, in a polycondensation resin mixed with said material.

9. The detector as defined in claim 8, wherein said material is aluminum.

10. The detector as defined in claim 8, wherein said material is magnesium oxide.

11. The detector as defined in claim 1, wherein said composition is a solid solution of a salt formed by a metal selected from the group consisting of indium and mercury, and an acid radical inert to neutrons, in a copolymer of phenol-formaldehyde resol resin with meta-chlorophenol-formaldehyde resin, in combination with a mixture of oxides of aluminum, nickel, iron and thallium, the latter oxides constituting said material.

12. The detector as defined in claim 11, wherein said meta-chlorophenol-formaldehyde resin contains 5% by weight of Cl.

13. The detector as defined in claim 12, wherein said salt solution is selected from the group consisting of indium nitrate and mercuric nitrate, and the content by weight of the components in said composition is as follows:

```
15 parts of Al_2O_3;
10 parts of Ni_2O_3;
3 parts of Fe_2O_3;
1 parts of Tl_2O;
0.1 parts of Hg(NO_3)_2; and
0.03 parts of In(NO_3)_3,
``` with said meta-chlorophenol-formaldehyde resin.

14. The detector as defined in claim 1, wherein said composition is a solid solution of indium nitrate in a polycondensation resin, in combination with a mixture of oxides of nickel and aluminum, the latter oxides constituting said material.

15. The detector as claimed in claim 14, wherein the content by weight of the components in said composition is as follows:

```
25 parts of Ni_2O_3;
40 parts of Al_2O_3;
2.5 parts of In(NO_3)_3; and
50 parts of polycondensation resin.
```

16. The detector as defined in claim 1, wherein said composition is a solid solution of a salt formed by lutecium, and an acid radical inert to neutrons, in a polycondensation resin mixed with red phosphorus, the latter constituting said material.

17. The detector as claimed in claim 16, wherein the content by weight of the components in said composition is as follows:

```
2 parts of Lu(NO_3)_3;
25 parts of red phosphorus; and
73 parts of polycondensation resin.
```

* * * * *